Aug. 14, 1956
G. B. LINDERMAN
2,758,712
DETECTING APPARATUS
Filed Aug. 18, 1952
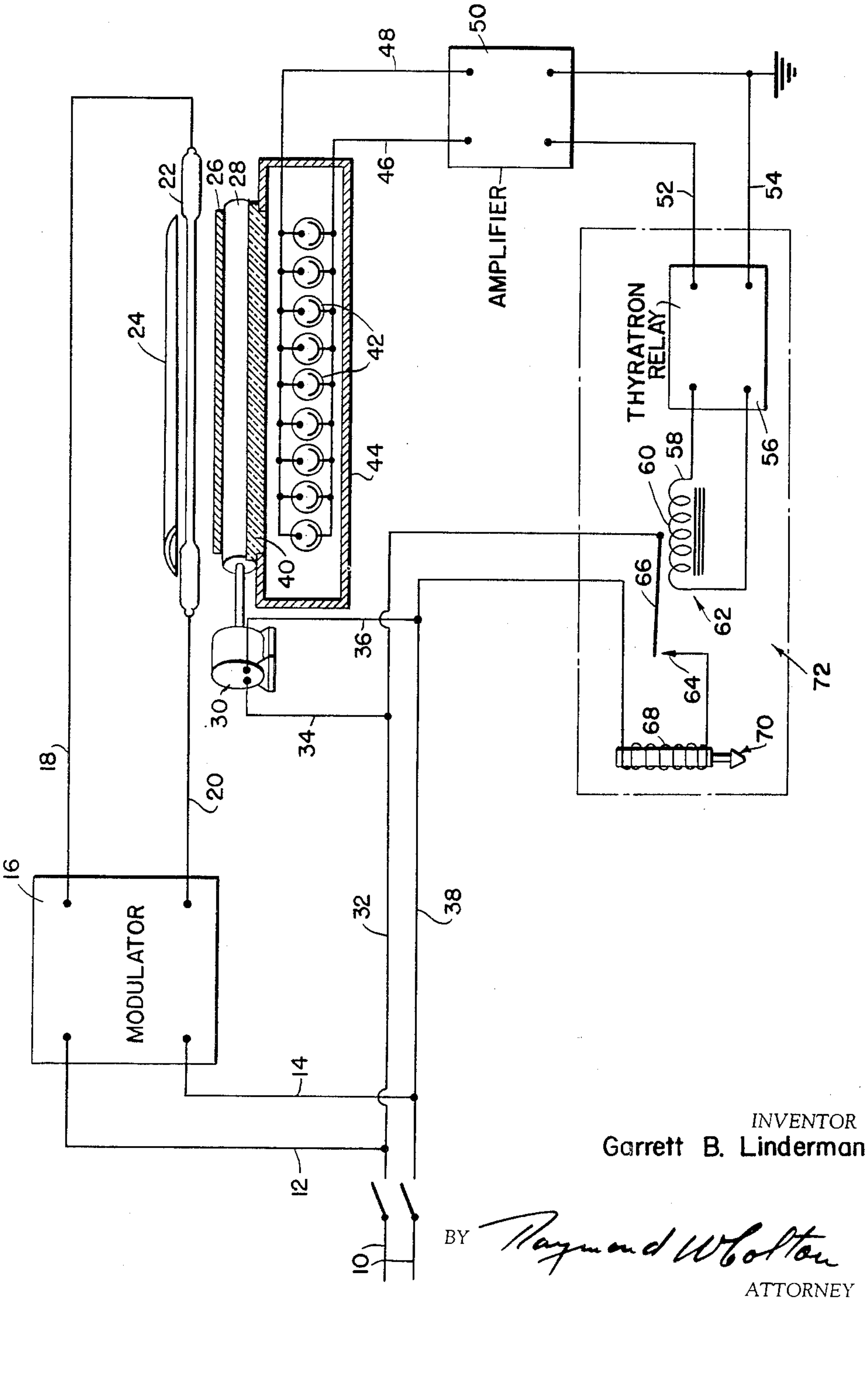
INVENTOR
Garrett B. Linderman
BY Raymond W. Colton
ATTORNEY 2,758,712

DETECTING APPARATUS

Garrett B. Linderman, Washington, D. C., assignor, by mesne assignments, to Linderman Engineering Company, Inc., a corporation of Maryland Application August 18, 1952, Serial No. 305,007

4 Claims. (Cl. 209—111)

This invention relates to apparatus for detecting light transmission through material traversing a predetermined path and is particularly intended for the detection of pin holes in tin plate.

Existing apparatus for the purpose is subject to certain limitations which have rendered it somewhat less than satisfactory. One of the difficulties encountered with existing equipment is the effect of stray light in producing a response which should occur only from the presence of a pin hole. Elongated openings in the material produce imperfect operation of the apparatus known heretofore. And in addition, inasmuch as collimated light is employed in conjunction with known installations, the occurrence of pin holes at any substantial angles to the vertical will not be detected and the imperfect portion of the material will not be removed.

Apparatus employed before that set forth herein was further limited in that its operation was entirely unsatisfactory at speeds of the tin plate below approximately 50 feet per minute.

It is among the objects of this invention to overcome the difficulties of previously known apparatus by using a modulated light source in conjunction with detecting and amplifying means tuned to respond only to frequencies corresponding with the modulation frequency. Moreover, by using ultra violet light and appropriate filters to exclude light of other wave lengths, stray light from sources of illumination will no longer present a problem.

In accordance with the present invention, reflectors for the ultra violet light sources are preferably employed to the exclusion of lenses so that the uncollimated light from the source and reflector will be transmitted through any pin holes which may exist, independent of their orientation.

The apparatus of the present invention comprises a light source, photosensitive means responsive to light from the source, the source and responsive means being disposed on opposite sides of the path of the material under observation, modulating means controlling the source to produce pulsations of light emitted therefrom, and amplifying means sharply tuned to the pulsation rate of the source, the amplifying means having an input circuit connected with the responsive means and an output circuit for energizing an actuator in response to light transmission through the material. The modulating means preferably comprises a source of alternating current and produces in excess of 3000 pulsations of light per second. An optical filter is preferably interposed between the path of the material under observation and the light responsive means to exclude light of undesired wave lengths. The light source preferably produces ultra violet light which is readily passed by the optical filter and to which the light responsive means and associated amplifier will be sensitive. The actuator preferably includes a relay, which may be of the thyratron type, for actuating the usual marking device and/or gate for separating imperfect material from that which is satisfactory.

The pin hole detecting apparatus is combined with means for feeding the tin plate along its predetermined path so that the operation will be properly synchronized.

A more complete understanding of the invention will follow a description of the accompanying diagrammatic showing of the apparatus and its electrical circuits.

A supply circuit comprising an alternating current source 10 is connected by leads 12 and 14 with a modulator 16 wherein modulations at an elevated frequency usually exceeding 2000 cycles per second, and preferably above 3000 cycles per second, are produced and delivered through leads 18 and 20 to a mercury lamp 22 serving as a source of ultra violet light. Inasmuch as there are two light pulses for each cycle, if the frequency delivered by the modulator is 4000 cycles for example, the light pulses will be produced at the rate of 8000 pulses per second. A reflector 24 is provided for the lamp so as to redirect stray light downwardly towards the tin plate or other material 26 under observation. This material is fed in the usual manner as depicted for example in the disclosure of the patent to Rendel, 2,576,043, dated November 20, 1951. For simplicity of illustration, a feed roll 28 has been depicted in the attached drawing as driven by a motor 30 energized through leads 32, 34, 36 and 38 from the source 10.

Arranged below the tin plate or other material under observation, an optical filter 40 is provided to exclude any light whose wave length varies appreciably from that of the source 22 operating at its predetermined modulated frequency. Below the filter 40, photo-multiplier tubes 42 are arranged in a bank within a housing 44 and connected in parallel by means of leads 46 and 48 to the input of an amplifier 50 which is sharply tuned to the rate of the light pulses produced by the source 22 and its modulator 16. The output of this amplifier is connected through leads 52 and 54 with a thyratron tube 56 whose output is in turn connected through a lead 58 to the winding 60 of a relay 62 whose fixed and movable contacts 64 and 66 respectively, are connected with the source 10 through leads 32 and 38 in series with a winding 68 of a marking device 70. The thyratron 56, relay 62 and marking device 70 have been considered to constitute an actuator 72, which of course could eliminate some of these parts and substitute others. For example, as indicated in the Rendel patent to which reference has already been made, a gate or deflector might be employed with or in lieu of a marking device.

Moreover, timing mechanisms and other instrumentalities such as those depicted and described by Rendel are contemplated for association with the components illustrated here in diagrammatic form.

In order to start the lamp 22, it is contemplated that it contains some neon in association with the mercury.

Whereas only one specific form of the invention has been illustrated in the drawings, those skilled in the art will recognize the many variations and applications which have already occurred to the present inventor. Accordingly, the scope of this invention should not be restricted to the illustrated example beyond the scope of the appended claims.

I claim:

1. Pin hole detecting apparatus for metal plate comprising feeding means directing work along a predetermined path, a source of light producing a component beyond the visible range, photoelectric means responsive to said component, a housing for said responsive means opaque to visible light, a filter transparent substantially only to said component forming a portion of said housing exposed to light from said source penetrating said plate, said source and responsive means being disposed on opposite sides of said path, modulating means providing a frequency controlling said source to produce pulsations of light substantially exceeding that of commercial lighting frequencies, amplifying means sharply tuned to the pulsation rate of said source, said amplifying means having an input circuit connected with said responsive means and an output circuit including classifying apparatus distinguishing continuous material from that containing holes.

2. Apparatus as set forth in claim 1 wherein said classifying apparatus includes a plate marking member.

3. Apparatus as set forth in claim 1 wherein said photoelectric means includes a plurality of cells arranged in substantial alignment and connected in parallel with said input circuit.

4. Apparatus as set forth in claim 1 wherein said component produced by said source is ultra violet light.

References Cited in the file of this patent

UNITED STATES PATENTS

| | | |
|---|---|---|
| Re. 20,297 | Rentschler | Mar. 16, 1937 |
| 1,963,185 | Wilson | June 19, 1934 |
| 2,021,573 | Alder | Nov. 19, 1935 |
| 2,037,925 | Rentschler | Apr. 21, 1936 |
| 2,056,392 | DeBoer et al. | Oct. 6, 1936 |
| 2,229,451 | Gulliksen | Jan. 21, 1941 |
| 2,232,373 | Dorst | Feb. 18, 1941 |
| 2,246,906 | Viebahn et al. | June 24, 1941 |
| 2,249,820 | Gulliksen | July 22, 1941 |
| 2,301,251 | Capen | Nov. 10, 1942 |
| 2,369,966 | Hawkins | Feb. 20, 1945 |
| 2,432,104 | Thomson | Dec. 9, 1947 |
| 2,461,254 | Bassett | Feb. 8, 1949 |
| 2,559,688 | Touvet | July 10, 1951 |
| 2,563,274 | Rendel | Aug. 7, 1951 |
| 2,593,391 | Bray | Apr. 15, 1952 |
| 2,607,899 | Cary et al. | Aug. 19, 1952 |